United States Patent
Balardeta et al.

(10) Patent No.: US 8,120,332 B2
(45) Date of Patent: *Feb. 21, 2012

(54) METHOD AND SYSTEM FOR SHOT TRACKING

(75) Inventors: Joseph Balardeta, Encinitas, CA (US); Scott Denton, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/071,963

(22) Filed: Mar. 25, 2011

(65) Prior Publication Data

US 2011/0269415 A1    Nov. 3, 2011

Related U.S. Application Data

(63) Continuation of application No. 12/769,558, filed on May 28, 2010, now Pat. No. 7,915,865.

(51) Int. Cl.
*H02J 7/00*    (2006.01)

(52) U.S. Cl. .................... 320/166; 340/10.1; 340/539.3; 340/568.6

(58) Field of Classification Search ........................ None
See application file for complete search history.

(56) References Cited

U.S. PATENT DOCUMENTS

| | | | |
|---|---|---|---|
| 5,877,686 A * | 3/1999 | Ibey et al. ................... 340/571 |
| 6,224,493 B1 | 5/2001 | Lee et al. |
| 6,402,634 B2 | 6/2002 | Lee et al. |
| 6,431,122 B1 * | 8/2002 | Westrick et al. ............... 119/721 |
| 6,431,990 B1 | 8/2002 | Manwaring |
| 6,638,175 B2 | 10/2003 | Lee et al. |
| 6,821,209 B2 | 11/2004 | Manwaring et al. |
| 7,163,468 B2 | 1/2007 | Gibbs et al. |
| 7,163,470 B2 | 1/2007 | Galloway et al. |
| 7,166,038 B2 | 1/2007 | Williams et al. |
| 7,214,143 B2 | 5/2007 | Deshmukh |
| 7,215,976 B2 * | 5/2007 | Brideglall ................... 455/552.1 |
| 7,252,600 B2 | 8/2007 | Murphy et al. |
| 7,258,626 B2 | 8/2007 | Gibbs et al. |
| 7,258,631 B2 | 8/2007 | Galloway et al. |
| 7,273,419 B2 | 9/2007 | Evans et al. |
| 7,413,520 B1 | 8/2008 | Hocknell et al. |
| 7,801,575 B1 * | 9/2010 | Balardeta et al. ............ 455/574 |
| 7,804,404 B1 * | 9/2010 | Balardeta et al. .......... 340/568.6 |
| 7,911,186 B1 * | 3/2011 | Balardeta et al. ............ 320/166 |
| 7,915,865 B1 * | 3/2011 | Balardeta et al. ............ 320/166 |
| 2008/0001720 A1 | 1/2008 | Tuttle |
| 2008/0147211 A1 | 6/2008 | Teller |
| 2009/0075761 A1 | 3/2009 | Balardeta et al. |
| 2010/0045443 A1 | 2/2010 | Steeves |

* cited by examiner

*Primary Examiner* — Ramy Ramadan
(74) *Attorney, Agent, or Firm* — Michael A. Catania; Rebecca Hanovice; Sonia Lari

(57) ABSTRACT

The present invention is a method for transmitting a RFID signal while conserving battery power of a circuit. The method comprises charging a capacitor using a battery. The battery is in electrical communication with a resistor and the resistor is in electrical communication with a capacitor and a load switch. The load switch is in electrical communication with an enabler and a microprocessor. The microprocessor is in electrical communication with a radiofrequency component. The load switch is closed, allowing power drawn from the capacitor to flow to the radiofrequency component.

1 Claim, 8 Drawing Sheets

US 8,120,332 B2

METHOD AND SYSTEM FOR SHOT TRACKING

CROSS REFERENCES TO RELATED APPLICATIONS

The Present Application is continuation application of U.S. patent application Ser. No. 12/769,558, filed on May 28, 2010, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to shot tracking. More specifically, the present invention relates to a method and circuit for transmitting a RFID signal while conserving battery power.

2. Description of the Related Art

Golf clubs combine with the players swing to propel a ball toward a favored location and through a favored path. The orientation and speed of the club head at impact largely determines the ball path including carry distance and roll.

The prior art is lacking in a method and circuit to measure the motion of the club through measurement of the shaft, while conserving battery power.

BRIEF SUMMARY OF THE INVENTION

The present invention is novel in that the observation of the relative motion does not depend on near visible light and uses a coherent pattern to capture the position of the club relative the ground antenna transmitter/receiver. This fixed device also includes a display, computing capability and recording device. This information, when processed, enables the display of the swing and uses data on the club head and ball to calculate the flight of the ball.

The present invention is a method for transmitting a RFID signal while conserving battery power of a circuit. The method comprises charging a capacitor using a battery. The battery is in electrical communication with a resistor and the resistor is in electrical communication with a capacitor and a load switch. The load switch is in electrical communication with an enabler and a microprocessor. The microprocessor is in electrical communication with a radiofrequency component. The load switch is closed, allowing power drawn from the capacitor to flow to the radiofrequency component. A signal is transmitted from the radiofrequency component, wherein a peak current of transmission of the signal is limited to 2 milliamps. A confirmation signal is received at the radiofrequency component, wherein the radiofrequency component operates at 2.4 giga-Hertz. The load switch is then opened and the capacitor is charged at a controlled rate.

The present invention further comprises a method for conserving power for a shot tracking device for attachment to a golf club. The method involves transmitting a plurality of signals from a shot tracking device attached to a golf club. The shot tracking device comprises a housing, a battery disposed within the housing, a sensor, and a plurality of board components disposed on a circuit board, the plurality of board components including a microprocessor. The shot tracking device is enabled to determine that a threshold number of signals has been transmitted by the shot tracking device and a receipt signal has not been received by the shot tracking device, which in turn deactivates the shot tracking device until a predetermined event occurs. The threshold number of signals ranges from 5 to 50.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
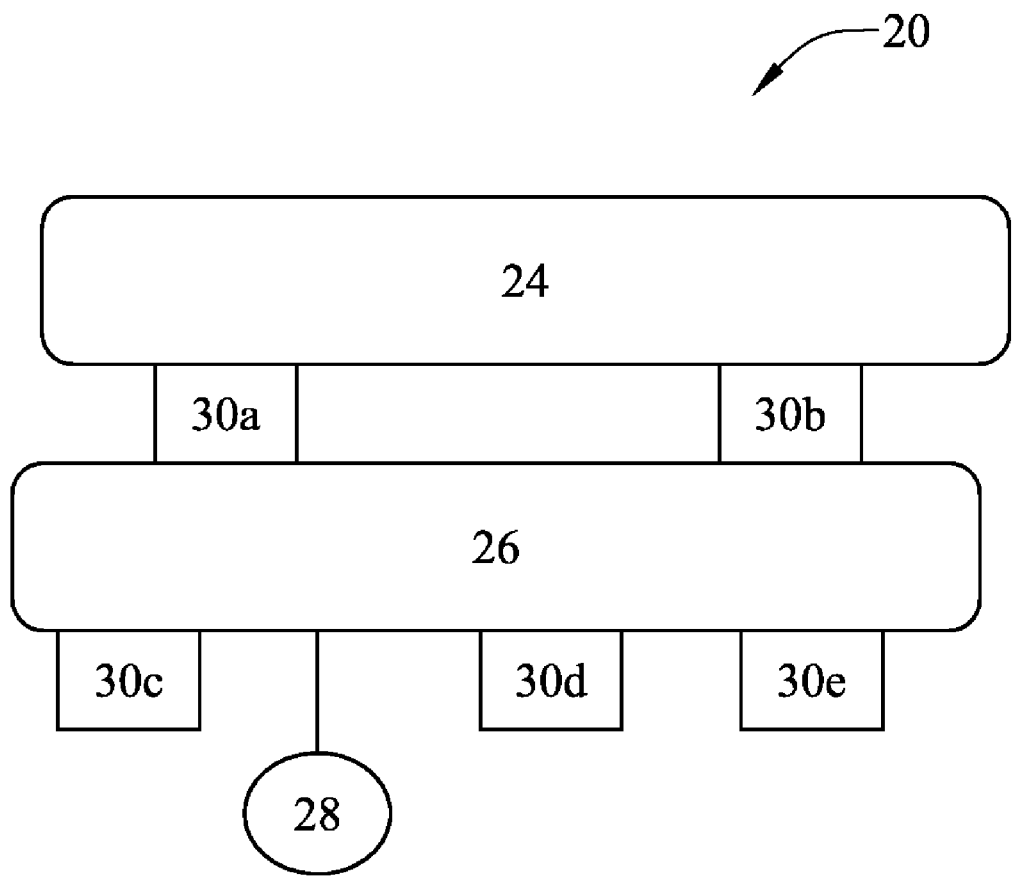
FIG. 1 is a perspective view of components of the circuit.

FIG. 1. shows components of the system which can be attached to a golf club. Alternatively, the components can be integrated into a golf club.

Figure 2:
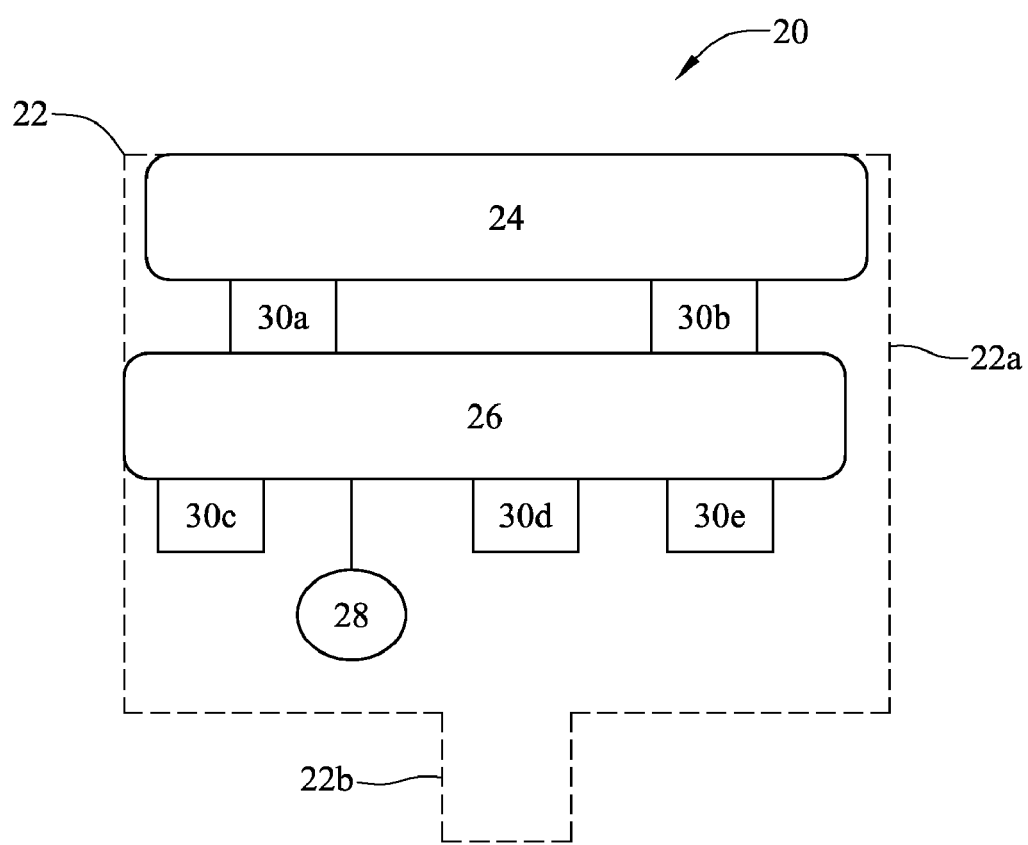
FIG. 2 is a perspective view of components of a system for the method, including the main body and projection body extending downward.

FIG. 2 shows the components of a system for shot tracking, including the main body of the housing and a projection extending downward.

Figure 3:
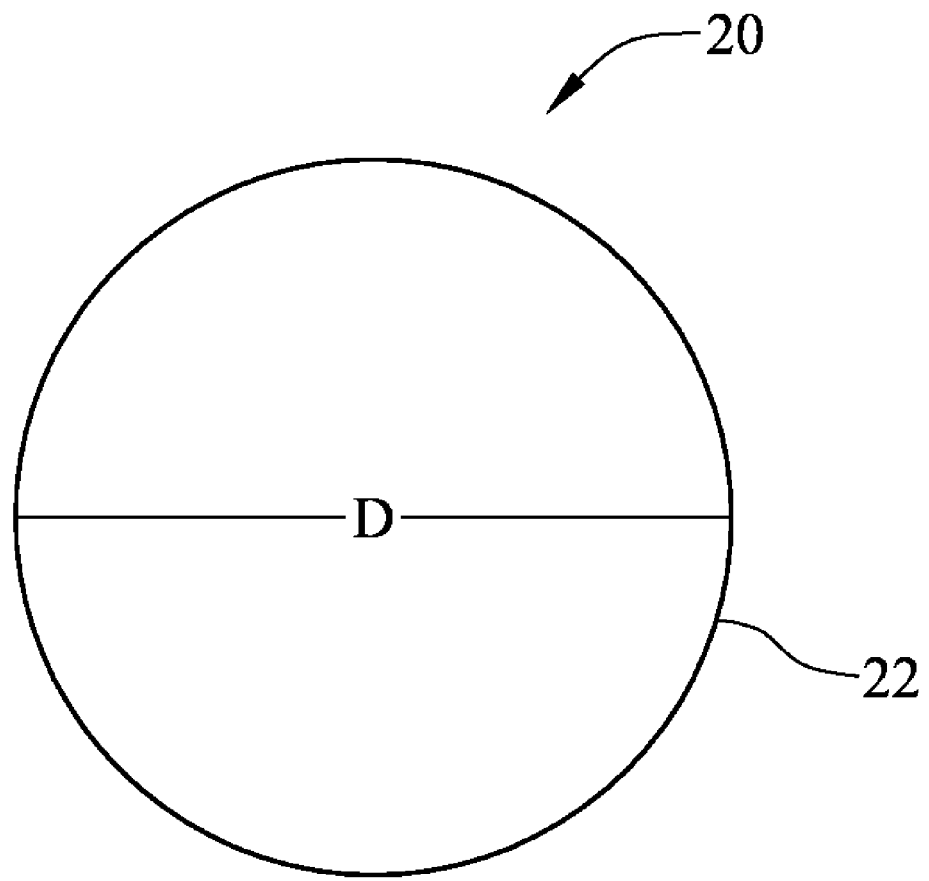
FIG. 3 is a perspective view of the shot tracking device and the housing component.

FIG. 3 shows the housing component of the shot tracking device and illustrates the diameter.

Figure 4:
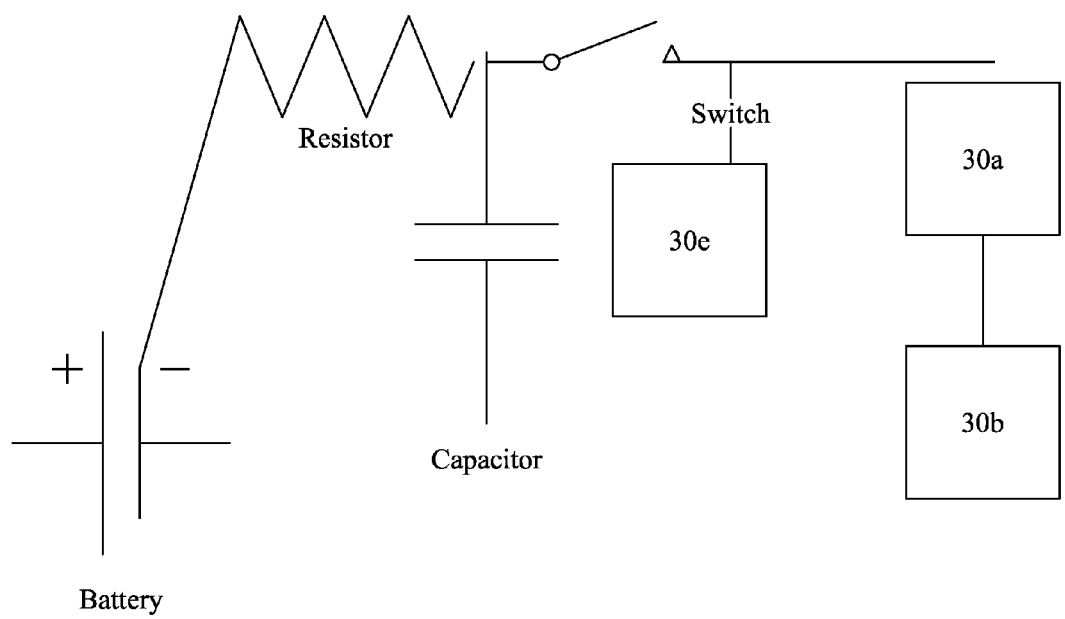
FIG. 4 is an illustration of the circuit diagram of the components of a system for shot tracking.

FIG. 4 illustrates a circuit diagram of the present invention. The components of the system 20 within the golf club 50 preferably include a power source, such as a battery 24, a GPS unit 30($a$), an RFID component 30($b$), a capacitor 30($c$), a resistor 30($d$), and an enabler 30($e$).

Figure 5:
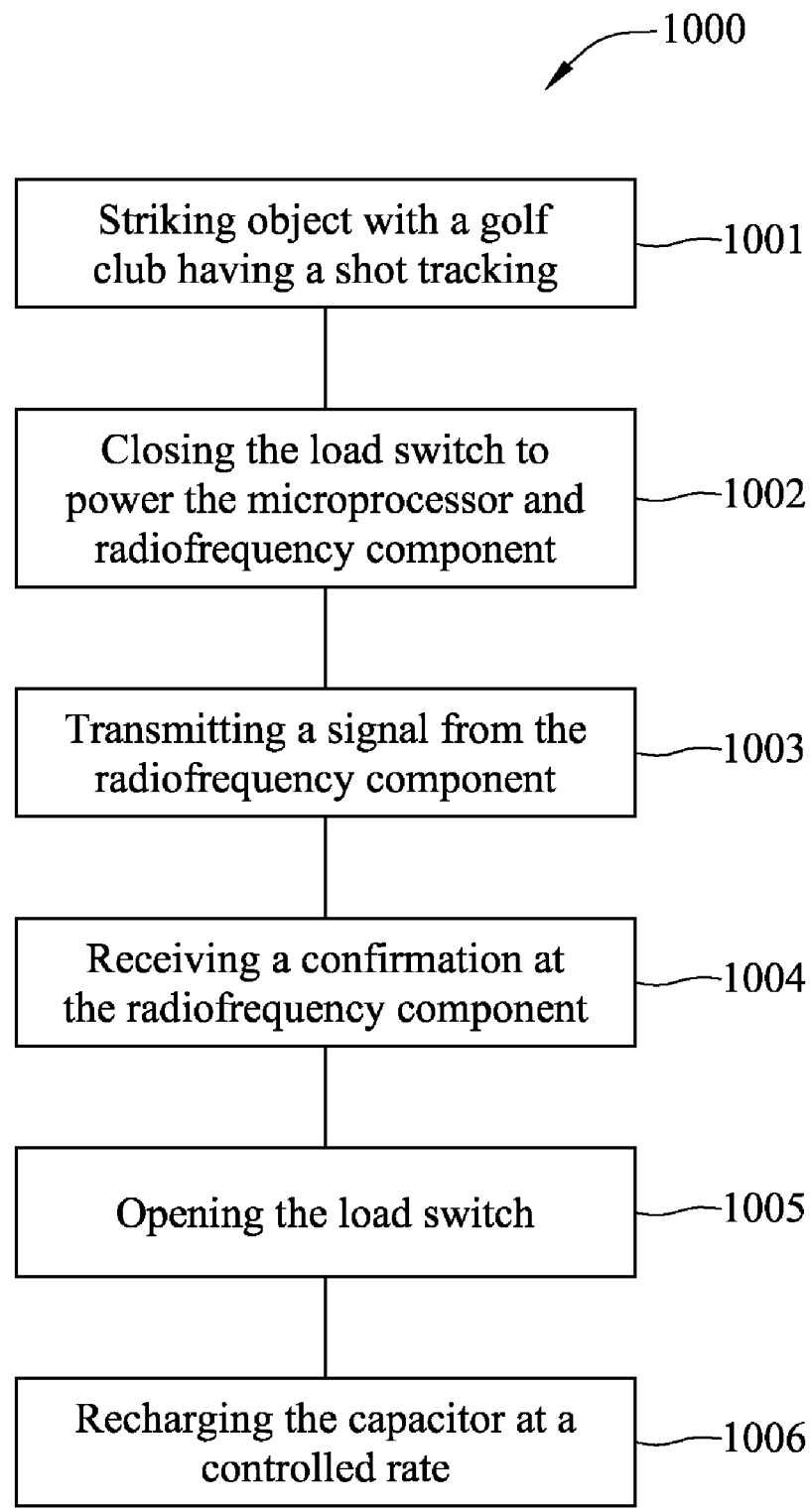
FIG. 5 is a flow chart of a method of conserving power of a circuit.

FIG. 5 is a flow chart of a method 1000 for conserving power for the circuit. At block 1001, a plurality of signals is transmitted from the shot tracking device attached to the golf club head. At block 1002, the threshold number of signals that have been transmitted by the shot tracking device without the receiving a receipt signal is determined. At block 1003, the shot tracking device is deactivated until the occurrence of a predetermined event.

Figure 6:
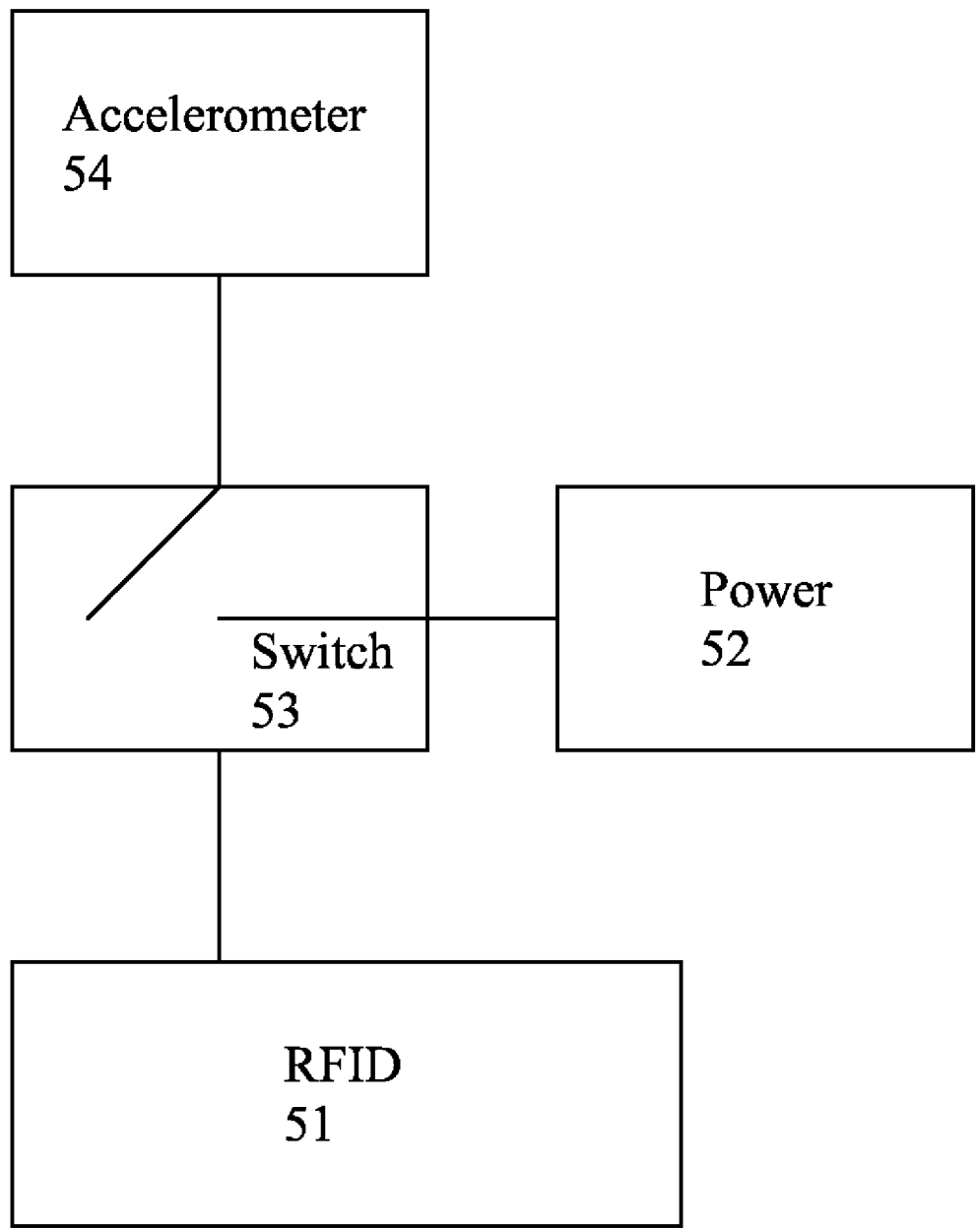
FIG. 6 is a block diagram of components of a system for shot tracking with the switch open.

FIG. 6 illustrates components of the system located within a golf club prior to impact of a golf club with a golf ball.

Figure 7:
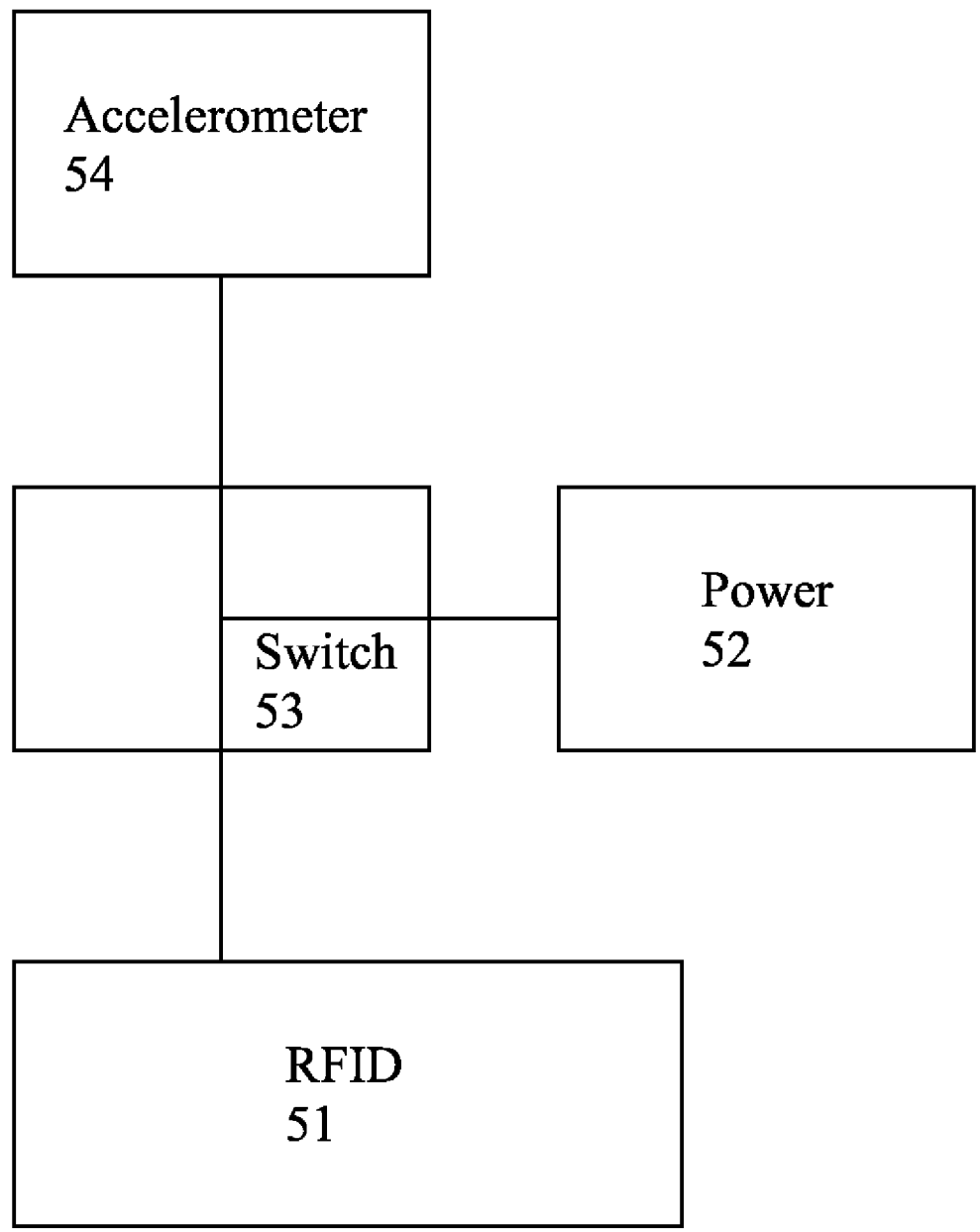
FIG. 7 is a block diagram of components of a system for shot tracking with the switch closed.

FIG. 7 illustrates components of the system located within a golf club subsequent to impact of a golf club with a golf ball.

Figure 8:
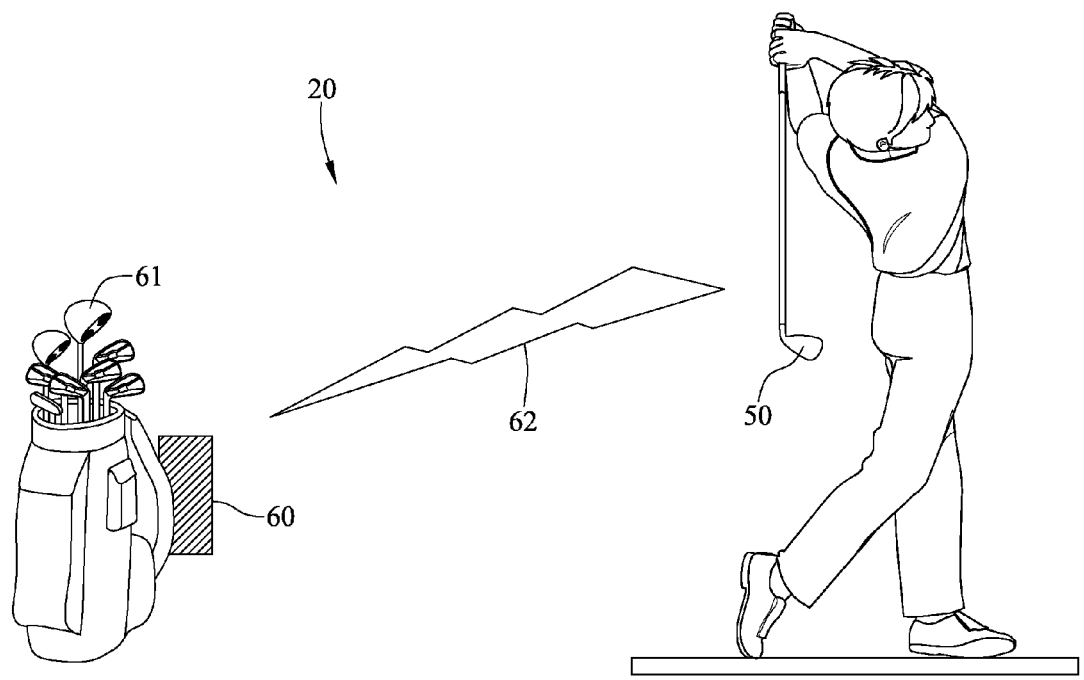
FIG. 8 is an illustration of a system for shot tracking.

FIG. 8 illustrates the system 20. A transponder in a golf club 50 swung by a golfer sends a signal 62 to a receiver 60. The receiver is attached to a golf bag 61, however, those skilled within the pertinent art will recognize that the receiver may be attached to any pertinent device including the golfer, or may stand alone.

In a preferred embodiment of the present invention, a shot tracking device 20 for attachment to a golf club 50 comprises a housing 22, a battery 24 disposed within the housing and a circuit board 26 disposed within the housing 22. A sensor 28 is disposed on the circuit board 26. A plurality of components 30 are disposed on both the first and second side of the circuit board 26. The shot tracking device 20 transmits a signal when the golf club 50 strikes a golf ball and the signal comprises the identification of the golf club 50.

Preferably, the housing 22 is a rubberized material formed around the battery 24, the circuit board 26, the sensor 28 and the plurality of chips. In an alternative embodiment, the housing 22 is an epoxy material formed around the battery 24, the circuit board 26, the sensor 28 and the plurality of components 30.

The plurality of components, disposed on the circuit board 26, include a microprocessor, an RFID component 30(b), a capacitor 30(c), a resistor 30(d) and an enabler 30(e). In one embodiment, the sensor 28 is a load switch. The housing 22 preferably comprises a main body 22(a) and a projection body 22(b). The projection body 22(b) preferably has a length that ranges from 5 mm to 1 mm. The housing 22 preferably has a diameter, D, that ranges from 20 mm to 25 mm. The battery 24 is preferably a CR1620 having at least 75 milliamps of power.

The plurality of board components 30 includes a microprocessor. The shot tracking device 20 transmits a signal when the golf club 50 strikes an object. The signal comprises the identification of the golf club 50. The microprocessor is configured to deactivate transmissions of the signal when a threshold number of signals are transmitted by the shot tracking device 20 and a receipt signal is not received by the shot tracking device 20. The threshold number of signals ranges from 5 to 50. The threshold number of signals preferably ranges from 10 to 40, more preferably from 15 to 30 and is most preferred to be 20. Each signal transmitted consumes approximately 2 milliamps of power. The signal comprises a frequency of approximately 2.4 GHz.

The method of the present invention comprises charging a capacitor 30(c) using a battery 24. The battery 24 is in electrical communication with a resistor 30(d) and the resistor 30(d) is in electrical communication with a capacitor 30(c) and a load switch 28. The load switch 28 is in electrical communication with an enabler 30(e) and a microprocessor. The microprocessor is in electrical communication with a radiofrequency component 30(b). The load switch 28 is closed, allowing power drawn from the capacitor 30(c) to flow to the radiofrequency component 30(b). A signal 62 is transmitted from the radiofrequency component 30(b), wherein a peak current of transmission of the signal 62 is limited to 2 milliamps. A confirmation signal is received at the radiofrequency component 30(b), wherein the radiofrequency component operates at 2.4 giga-Hertz. The load switch 28 is then opened and the capacitor 30(c) is charged at a controlled rate.

The circuit 26 for transmitting a RFID signal 62 while conserving battery power comprises a battery 24 in electrical communication with a resistor 30(d), wherein the battery 24 is a three volt battery and the resistor 30(d) controls the rate at which the capacitor 30(c) is charged. The resistor 30(d) is in electrical communication with the capacitor 30(c) and a load switch 30(f). The capacitor 30(c) is preferably a 1 micro Faraday capacitor. The load switch 30(f) is in electrical communication with the microprocessor 30(a), wherein when the load switch 30(f) is closed, current drawn from the capacitor 30(c) is allowed to flow to the microprocessor 30(a). The microprocessor 30(a) is in electrical communication with a radiofrequency component 30(b), wherein a signal 62 is transmitted from the radiofrequency component 30(b) and a confirmation signal is received at the radiofrequency component 30(b), wherein the radiofrequency component 30(b) operates at 2.5 giga-Hertz. A peak current of transmission of the signal is limited to 2 milliamps.

In an alternative embodiment of the present invention, the shot tracking device 20 comprises a housing 22 with a main body 22(a) and a projection body 22(b) extending downward from the main body 22(a). A battery 24 is disposed within the housing 22 and a circuit board 26 is disposed within the housing 22 and below the battery 24. The circuit board 26 is double sided, and has a shock switch disposed on the second side. A plurality of components 30, including a microprocessor, an RFID chip 30(b), a capacitor 30(c), a resistor 30(d), and an enabler 30(e), are disposed on both the first and second side of the circuit board 26. The shot tracking device 20 transmits a signal when the golf club 50 strikes a golf ball, the signal comprising an identification of the golf club 50.

The plurality of board components 30 includes a microprocessor. The shot tracking device 20 transmits a signal when the golf club 50 strikes an object. The signal comprises the identification of the golf club 50. The microprocessor is configured to deactivate transmissions of the signal when a threshold number of signals are transmitted by the shot tracking device 20 and a receipt signal is not received by the shot tracking device 20. The threshold number of signals ranges from 5 to 50. The threshold number of signals preferably ranges from 10 to 40, more preferably from 15 to 30 and is most preferred to be 20. Each signal transmitted consumes approximately 2 milliamps of power. The signal comprises a frequency of approximately 2.4 GHz.

Preferably, the housing 22 is a rubberized material formed around the battery 24, the circuit board 26, the sensor 28 and the plurality of chips. Alternatively, the housing 22 is an epoxy material formed around the battery 24, the circuit board 26, the sensor 28 and the plurality of board components 30.

The battery 24 is preferably a CR1620 having at least 75 milliamps of power. Preferably, the sensor 28 is a shock switch. The housing 22 preferably has a diameter, D, that ranges from 20 mm to 25 mm. The projection body 22(b) preferably has a length that ranges from 5 mm to 10 mm.

The present invention further comprises a method for conserving power for a shot tracking device 20 for attachment to a golf club 50. The method 1000 involves transmitting a plurality of signals from a shot tracking device 20 attached to a golf club 50. The shot tracking device 20 comprises a housing 22, a battery 24 disposed within the housing 22, a sensor 28, and a plurality of board components 30 disposed on a circuit board 26, the plurality of board components 30 including a microprocessor. The shot tracking device 20 is enabled to determine that a threshold number of signals has been transmitted by the shot tracking device 20 and a receipt signal has not been received by the shot tracking device 20, which in turn deactivates the shot tracking 20 device until a predetermined event occurs. The threshold number of signals ranges from 5 to 50. The threshold number of signals preferably ranges from 10 to 40, more preferably from 15 to 30 and is most preferred to be 20. Each signal transmitted consumes approximately 2 milliamps of power. The signal comprises a frequency of approximately 2.4 GHz. The predetermined event is preferably a receipt signal being received by the shot tracking device 20. Alternatively, the predetermine event may be a period of time passing. The period of time passing is preferably one hour.

When the load switch 53 is closed, power 52 flows to the microprocessor 30(a) and the radiofrequency component 30(b). The power 52 is drawn from the capacitor 30(c). A signal 62 is transmitted from the radiofrequency component 30(b) and a confirmation signal 62 is received at the radiofrequency component 30(*b*). The load switch 53 is opened and the capacitor 30(*c*) is recharged at a controlled rate.

The peak current for transmission of the signal 62 is preferably limited to 2 milliamps. The radiofrequency component 30(*b*) preferably operates at 2.4 giga-Hertz. Preferably, the microprocessor 30(*a*) and the radiofrequency component 30(*b*) are integrated. The capacitor 30(*c*) is preferably a 1 micro-Faraday capacitor.

The receiver is preferably a GPS device such as disclosed in Balardeta et al., U.S. Patent Publication No. 20090075761 for a Golf GPS Device And System, which is hereby incorporated by reference in its entirety. Alternatively, the receiver is a personal digital assistant (PDA), "smart phone", mobile phone, or other similar device. However, those skilled in the pertinent art will recognize that the receiver may be any device capable of receiving and storing signals from the RFID tag.

Gibbs, et al., U.S. Pat. No. 7,163,468 is hereby incorporated by reference in its entirety.

Galloway, et al., U.S. Pat. No. 7,163,470 is hereby incorporated by reference in its entirety.

Williams, et al., U.S. Pat. No. 7,166,038 is hereby incorporated by reference in its entirety.

Desmukh U.S. Pat. No. 7,214,143 is hereby incorporated by reference in its entirety.

Murphy, et al., U.S. Pat. No. 7,252,600 is hereby incorporated by reference in its entirety.

Gibbs, et al., U.S. Pat. No. 7,258,626 is hereby incorporated by reference in its entirety.

Galloway, et al., U.S. Pat. No. 7,258,631 is hereby incorporated by reference in its entirety.

Evans, et al., U.S. Pat. No. 7,273,419 is hereby incorporated by reference in its entirety.

Hocknell, et al., U.S. Pat. No. 7,413,250 is hereby incorporated by reference in its entirety.

The measurements may be inputted into an impact code such as the rigid body code disclosed in U.S. Pat. No. 6,821,209, entitled Method for Predicting a Golfer's Ball Striking Performance, which is hereby incorporated by reference in its entirety.

The swing properties are preferably determined using an acquisition system such as disclosed in U.S. Pat. No. 6,431,990, entitled System and Method for Measuring a Golfer's Ball Striking Parameters, assigned to Callaway Golf Company, the assignee of the present application, and hereby incorporated by reference in its entirety. However, those skilled in the pertinent art will recognize that other acquisition systems may be used to determine the swing properties.

Other methods that are useful in obtaining a golfer's swing characteristics are disclosed in U.S. Pat. No. 6,638,175, for a Diagnostic Golf Club System, U.S. Pat. No. 6,402,634, for an Instrumented Golf Club System And Method Of Use, and U.S. Pat. No. 6,224,493, for an Instrumented Golf Club System And Method Of Use, all of which are assigned to Callaway Golf Company, the assignee of the present application, and all of which are hereby incorporated by reference in their entireties.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for transmitting a wireless signal from a device while conserving battery power of the device, the method comprising:

charging a capacitor using a battery, the battery in electrical communication with a resistor, the resistor in electrical communication with a capacitor and a load switch, the load switch in electrical communication with an enabler and a microprocessor, the microprocessor in electrical communication with a radiofrequency component, wherein the resistor controls the rate at which the capacitor is charged from the battery in order to conserve power;

closing the load switch to power the microprocessor and the radiofrequency component, the power drawn from the capacitor;

transmitting a signal from the radiofrequency component, wherein a peak current of transmission of the signal is less than 2 milliamps;

receiving a confirmation signal at the radiofrequency component, wherein the radiofrequency component operates at 2.4 giga-Hertz;

opening the load switch; and recharging the capacitor at a controlled rate;

wherein in order to conserve battery power, the radiofrequency component transmits a signal until the confirmation signal is received or until a threshold number of signals are sent from the radiofrequency component without a confirmation signal, the threshold number of signals ranging from 5 to 50.

* * * * *